(12) United States Patent
Yannone (10) Patent No.: US 8,081,106 B2
(45) Date of Patent: Dec. 20, 2011

(54) TARGET RANGING USING INFORMATION FROM TWO OBJECTS

(75) Inventor: Ronald M. Yannone, Nashua, NH (US)

(73) Assignee: BAE Systems Information and Electric Systems Integration Inc., Nashua, NH (US)

(*) Notice: Subject to any disclaimer, the term of this patent is extended or adjusted under 35 U.S.C. 154(b) by 313 days.

(21) Appl. No.: 12/364,480

(22) Filed: Feb. 2, 2009

(65) Prior Publication Data

US 2009/0231181 A1   Sep. 17, 2009

Related U.S. Application Data

(60) Provisional application No. 61/063,251, filed on Jan. 31, 2008, provisional application No. 61/063,290, filed on Jan. 31, 2008, provisional application No. 61/063,271, filed on Jan. 31, 2008, provisional application No. 61/063,207, filed on Jan. 31, 2008.

(51) Int. Cl.
   *G01S 13/42* (2006.01)

(52) U.S. Cl. ........ 342/125; 342/133; 342/139; 342/140; 342/146; 342/417

(58) Field of Classification Search .................. 342/125, 342/133, 139–141, 146, 417, 443, 450, 458
See application file for complete search history.

(56) References Cited

U.S. PATENT DOCUMENTS

| | | | | |
|---|---|---|---|---|
| 3,895,382 A | * | 7/1975 | Litchford | 342/32 |
| 4,293,857 A | * | 10/1981 | Baldwin | 342/32 |
| 4,370,656 A | * | 1/1983 | Frazier et al. | 342/458 |
| 4,668,954 A | * | 5/1987 | Tomasi | 342/387 |
| 5,247,307 A | * | 9/1993 | Gandar et al. | 342/192 |
| 5,479,360 A | * | 12/1995 | Seif et al. | 342/161 |
| 5,566,074 A | * | 10/1996 | Hammer | 701/301 |
| 5,977,906 A | * | 11/1999 | Ameen et al. | 342/174 |

(Continued)

FOREIGN PATENT DOCUMENTS

WO   WO 2006135416 A2 * 12/2006

(Continued)

OTHER PUBLICATIONS

Gregoire, D.G.; Singletary, G.B.; , "Advanced ESM AOA and location techniques," Aerospace and Electronics Conference, 1989. NAECON 1989., Proceedings of the IEEE 1989 National , vol., no., pp. 917-924 vol. 2, May 22-26, 1989.*

(Continued)

*Primary Examiner* — John Sotomayor
(74) *Attorney, Agent, or Firm* — Graybeal Jackson LLP (57) ABSTRACT

In an embodiment, an apparatus includes a detector, direction finder, receiver, and range finder. The detector is operable to detect a target, and the direction finder is operable to determine a first direction to the target from the apparatus. The receiver is operable to receive a second direction to the target from a remote object, and the range finder is operable to determine from the first and second directions a range of the target from the apparatus. For example, the apparatus may be a first fighter jet, and the remote object may be a second fighter jet. By using directional information from both the first and second jets, a computer system onboard the first jet may compute a range to the target from the first jet more quickly and more accurately than by using directional information from only the first jet.

26 Claims, 7 Drawing Sheets

U.S. PATENT DOCUMENTS

| | | | |
|---|---|---|---|
| 6,150,979 A * | 11/2000 | Tsui | 342/357.61 |
| 6,564,149 B2 * | 5/2003 | Lai | 701/301 |
| 6,614,012 B2 * | 9/2003 | Schneider et al. | 244/3.1 |
| 6,674,464 B1 | 1/2004 | Mizutani et al. | |
| 6,809,679 B2 * | 10/2004 | LaFrey et al. | 342/37 |
| 6,963,291 B2 * | 11/2005 | Holforty et al. | 340/945 |
| 7,002,510 B1 * | 2/2006 | Choate et al. | 342/118 |
| 7,132,961 B2 | 11/2006 | Yannone et al. | |
| 7,418,343 B1 * | 8/2008 | McGraw et al. | 701/300 |
| 7,453,400 B2 * | 11/2008 | Struckman et al. | 342/465 |
| 7,579,989 B2 | 8/2009 | Winterling et al. | |
| 7,764,217 B2 * | 7/2010 | Yannone | 342/13 |
| 7,978,049 B2 * | 7/2011 | Leitch | 340/5.72 |
| 2005/0110661 A1 * | 5/2005 | Yannone et al. | 340/945 |
| 2009/0231181 A1 * | 9/2009 | Yannone | 342/29 |
| 2009/0310664 A1 | 12/2009 | Yannone | |
| 2010/0156697 A1 | 6/2010 | Yannone | |
| 2011/0187582 A1 * | 8/2011 | Tsunekawa | 342/107 |

FOREIGN PATENT DOCUMENTS

| | | |
|---|---|---|
| WO | WO 2007065879 | 6/2007 |
| WO | WO 2008051204 | 5/2008 |

OTHER PUBLICATIONS

Ross L. Finney, Maurice D. Weir & Frank R. Giordano, "Lines and Planes in Space", "Thomas' Calculus", 10th edition, 2003, pp. 807-808, Addison Wesley, Boston, USA.

* cited by examiner

TARGET RANGING USING INFORMATION FROM TWO OBJECTS

CLAIM OF PRIORITY

This application claims priority to U.S. Provisional Application Ser. Nos. 61/063,251, 61/063,290, 61/063,271 and 61/063,207, filed on Jan. 31, 2008, which are incorporated by reference.

STATEMENT OF GOVERNMENT INTEREST

The invention was made with United States Government support under Contract No. N00019-02-C-3002. Accordingly, the United States Government has certain rights in this invention.

SUMMARY

This Summary is provided to introduce, in a simplified form, a selection of concepts that are further described below in the Detailed Description. This Summary is not intended to identify key features or essential features of the claimed subject matter, nor is it intended to be used to limit the scope of the claimed subject matter.

In an embodiment, an apparatus includes a detector, direction finder, receiver, and range finder. The detector is operable to detect a target, and the direction finder is operable to determine a first direction to the target from the apparatus. The receiver is operable to receive a second direction to the target from a remote object, and the range finder is operable to determine from the first and second directions a range of the target from the apparatus.

For example, the apparatus may be a first fighter jet, and the remote object may be a second fighter jet. By using directional information from both the first and second jets, a computer system onboard the first jet may compute a range to the target from the first jet more quickly and more accurately than by using directional information from only the first jet.

DETAILED DESCRIPTION

Figure 1:
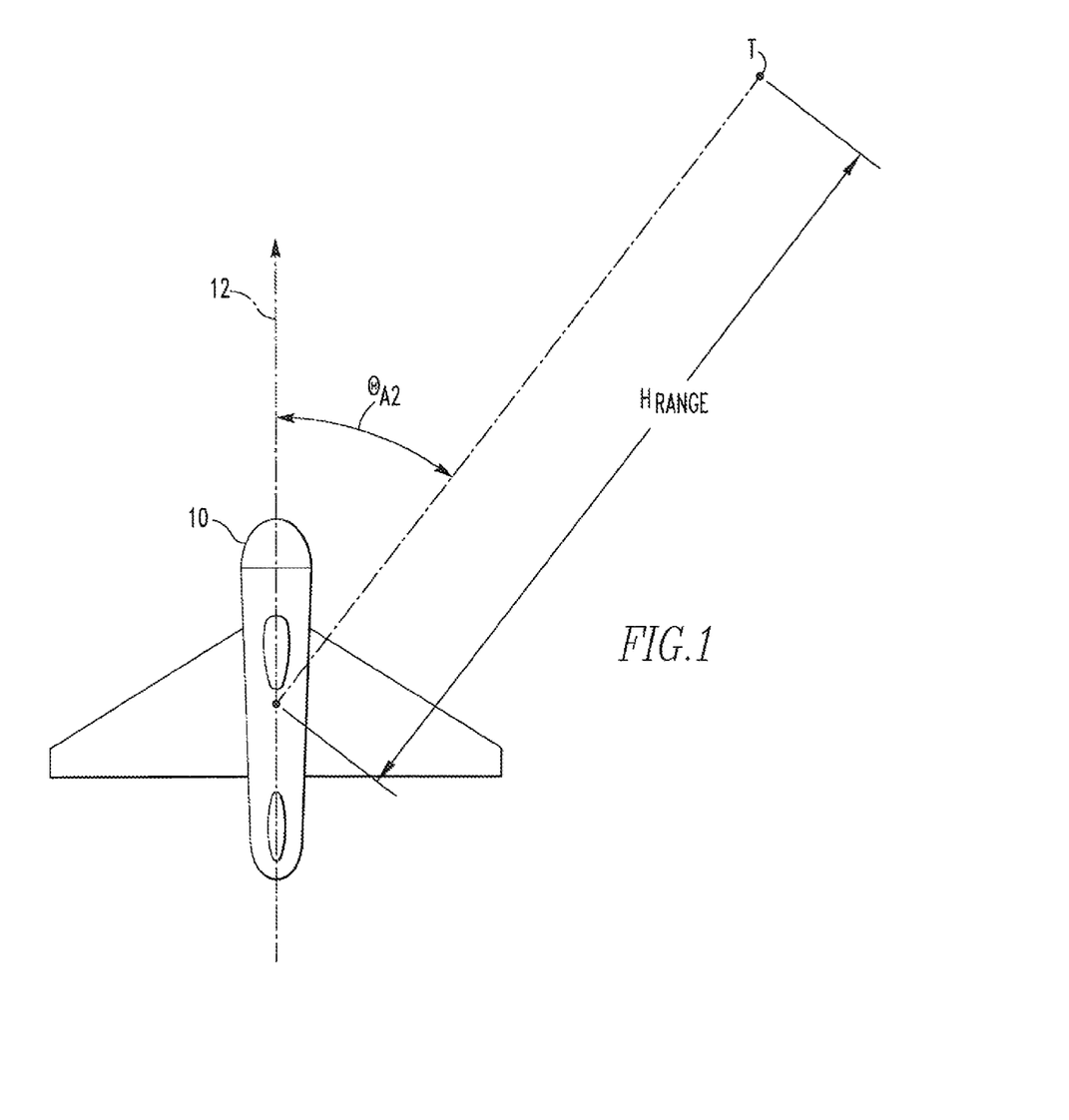
FIG. 1 is an overhead view of a fighter jet and a target.

FIG. 1 is an overhead view of a fighter jet 10 traveling at a heading 12 and at a level altitude, and of a target T, which may be airborne, ground based, moving, or stationary. The target T is located at an azimuth angle $\theta_{AZ}$ from the heading 12 and at an azimuth range $H_{RANGE}$ from the jet 10.

Geometrically speaking, $H_{RANGE}$ is the projection of the actual range (not shown in FIG. 1) from the jet 10 to the target T in both the jet azimuth plane and in all earth azimuth planes because the jet is flying at a substantially level altitude, i.e., is flying substantially parallel to the earth's surface. For purposes of discussion, the jet azimuth plane is a plane that passes through the jet's fuselage from nose to tail and in which both of the jet's wings lie or to which both of the jet's wings are parallel. An earth azimuth plane is any plane that is parallel to the earth's surface, or, more precisely, any plane that is perpendicular to a radius line of the earth. Therefore, when the jet 10 is flying at a level altitude, the jet's azimuth plane is either coincident with or parallel to a selected earth azimuth plane depending on the altitude of the selected plane. That is, if the altitude of a selected earth azimuth plane is the same as the level altitude of the jet 10, then the jet azimuth plane can be said to be coincident with the earth azimuth plane; but if the altitudes of the selected earth azimuth plane and the jet's azimuth plane are different, then these planes are parallel to, but not coincident with, each other. It is sometime convenient to select the earth azimuth plane in which the target T lies as the earth azimuth plane for target-ranging calculations.

Figure 2:
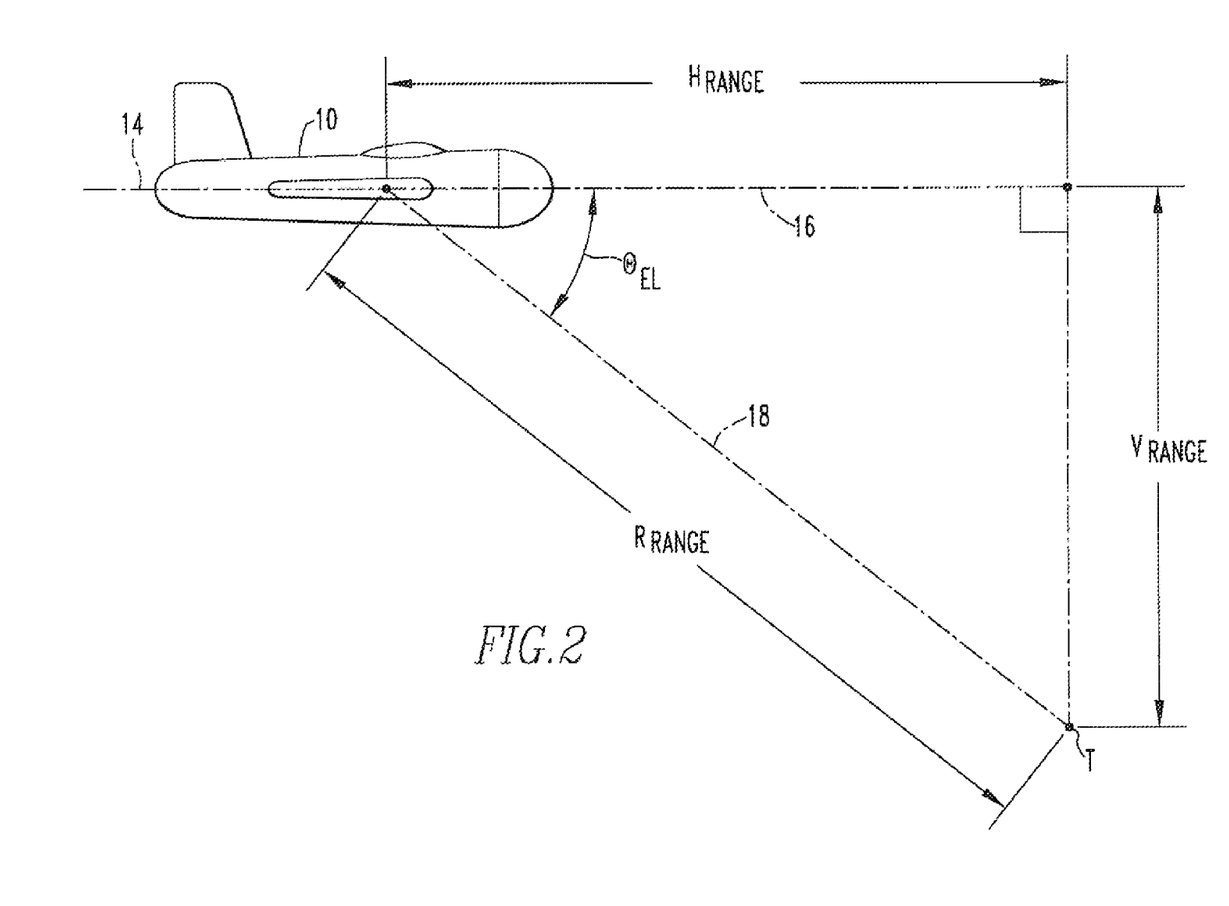
FIG. 2 is a side elevation view of the fighter jet and target of FIG. 1.

FIG. 2 is a side elevation view of the fighter jet 10 and the target T of FIG. 1. The target T is located at an elevation angle $\theta_{EL}$ from the jet azimuth plane 14 and at a vertical distance $V_{RANGE}$ from the jet 10.

Geometrically speaking, the target T lies in an elevation plane which is perpendicular to the jet azimuth plane 14 and which includes the straight line 16 along which $H_{RANGE}$ is measured. For example, in this embodiment, the elevation plane may be coincident with the page of FIG. 2.

Referring to FIGS. 1 and 2, the fighter jet 10 typically includes a targeting system (not shown in FIGS. 1 and 2) for detecting the target T, and for determining $\theta_{AZ}$, $\theta_{EL}$, $R_{RANGE}$, and $H_{RANGE}$, and potentially $V_{RANGE}$. For example, the targeting system may actively detect and range the target by transmitting a signal (e.g., a radar signal) that impinges upon, and is reflected back to the jet 10 by, the target T, and by receiving the reflected signal with a directional antenna (not shown in FIGS. 1 and 2). The targeting system may then determine $\theta_{AZ}$ and $\theta_{EL}$ by analyzing the phase of the received signal at each of multiple elements of the antenna. Alternatively, the targeting system may passively detect and range the target T by similarly analyzing a signal emitted by the target to determine $\theta_{AZ}$ and $\theta_{EL}$. Passive detection may be useful when the pilot of the fighter jet 10 does not want to alert the target T to the jet's presence, or when the target is a "pop-up" target (e.g., a hand-held rocket launcher) that is difficult or impractical to actively detect. Because such target detecting and ranging systems are known, the details of such a system are omitted for brevity.

Referring again to FIG. 2, although the target detecting and ranging system onboard the fighter jet 10 can determine from $\theta_{AZ}$ and $\theta_{EL}$ that the target T lines along a straight-line path 18, the system cannot determine from these angles alone a value for $R_{RANGE}$, $H_{RANGE}$, or $V_{RANGE}$.

Therefore, the targeting system onboard the jet 10 needs additional information to determine at least one of $R_{RANGE}$, $H_{RANGE}$, and $V_{RANGE}$. Once the targeting system determines at least one of these values, it can determine the remaining ones of these values via a trigonometric identity such as the law of sines.

For example, a targeting system employing passive detection may obtain this additional information by comparing a signature of a signal emitted from the target T with signal signatures that are stored in a database.

If the signature of the emitted signal matches a signature in the database, then the targeting system may be able to identify the target T, and may be able to retrieve from the database information describing the target and or the emitted signal.

For example, if the database includes a plot of distance vs. signal-to-noise-ratio (SNR) for the emitted signal, then the targeting system may calculate $R_{RANGE}$ by measuring the SNR of the emitted signal at the fighter jet 10 and obtaining a value for $R_{RANGE1}$ from the plot.

But this technique for calculating $R_{RANGE}$ may require a significant processing time, and thus the system may be relatively slow in providing an accurate value for $R_{RANGE}$. Furthermore, phenomena such as an atmospheric disturbance and multipath may render the measurement of $R_{RANGE}$ too inaccurate for some applications regardless of the needed processing time. As an example of when ranging convergence and accuracy may be an issue, there are some targets, e.g., pop-up targets, that the targeting system may be unable to detect until the jet 10 is practically "on top" of the target (e.g., $H_{RANGE}$ is ten or fewer nautical miles). This inability of the targeting system may be due to the target (e.g., a rocket launcher) not being activated until the jet 10 is in sight, or the target being hidden by a mountain or other object. At the speed that the fighter jet 10 may be travelling toward the target T (and the speed at which the target may be travelling toward the jet if the target is airborne), the pilot may have only a few seconds to decide on the best course of action (e.g., engage or evade the target), so the convergence time and the accuracy of the ranging calculation may be an important factor in allowing the pilot sufficient time to make the best decision and to execute the corresponding maneuver.

Alternatively, if the target detecting and ranging system determines that the target T is a type of ground-based target (e.g., a tank or rocket launcher), then, if the target is at sea level, $V_{RANGE}$ is substantially equal to the altitude of the fighter jet 10—because the altitude is measured by an altimeter (not shown in FIGS. 1-2) on board the jet, the targeting system has access to the altitude. Once the targeting system has a value for $V_{RANGE}$, the system can calculate $H_{RANGE}$ and $R_{RANGE}$ using the law of sines.

But depending on the terrain in the vicinity of the target T, the target detecting and ranging system onboard the jet 10 may be unable to assume that the target is at sea level. For example, if the target T is located in a mountainous region, then the target may be thousands of feet above or below sea level. And even if the targeting system has access to data representing the terrain in the vicinity of the target T, processing this data to determine the height at which the target is located may be relatively time consuming, inaccurate, or both time consuming and inaccurate. And such slow or inaccurate processing may make this ranging technique unsuitable for certain applications as discussed above.

Figure 3:
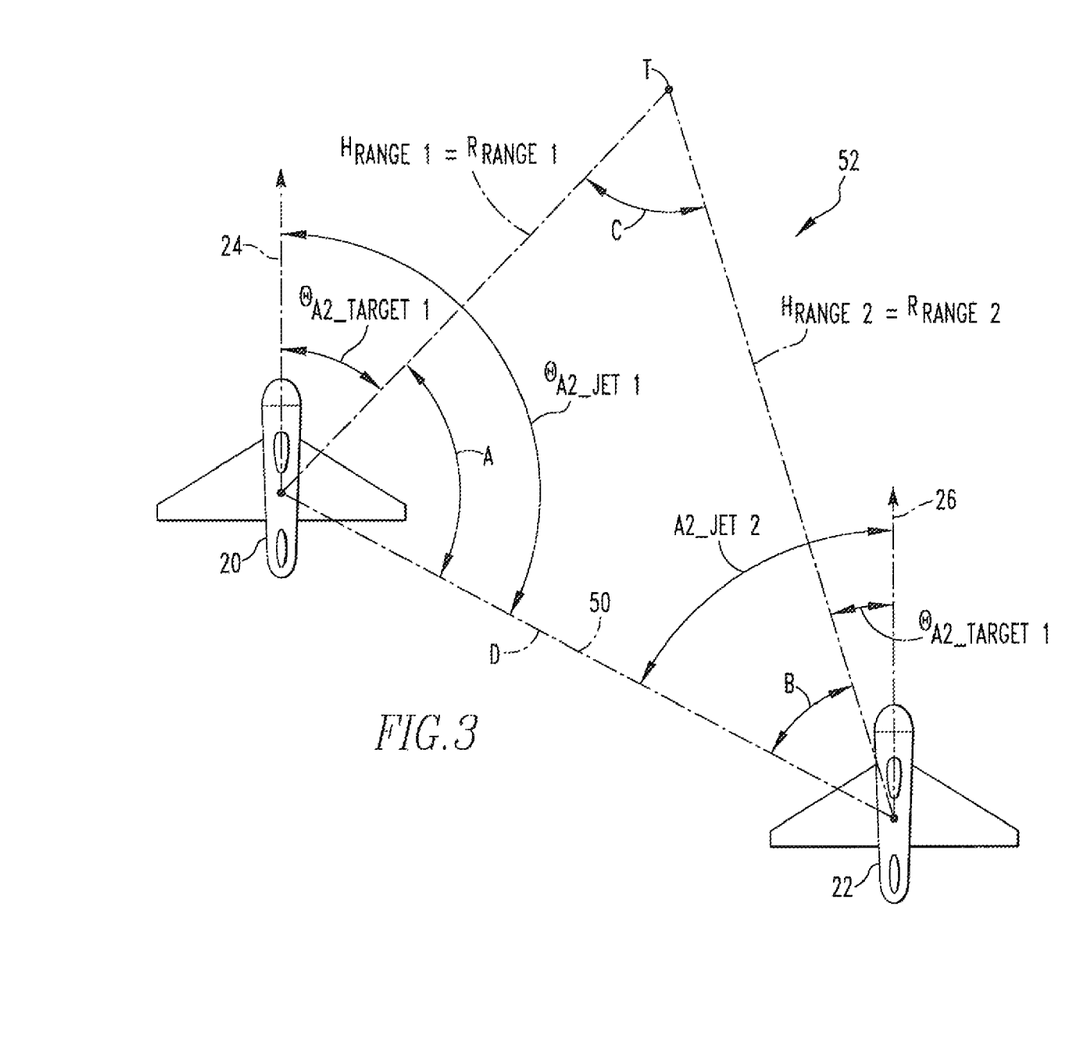
FIG. 3 is an overhead view of first and second fighter jets and a target, and illustrates an embodiment of a technique for ranging the target.

FIG. 3 is an overhead view of an embodiment of two fighter jets 20 and 22 traveling at substantially the same level altitude and at substantially parallel headings 24 and 26, and of an embodiment of an airborne target T at substantially the same altitude as the jets. Therefore, as discussed below, by using target information from both jets, either of the jets may determine a range to the target T more quickly, more accurately, or both more quickly and more accurately as compared to the ranging techniques discussed above in conjunction with FIGS. 1 and 2. Furthermore, because the jets 20 and 22 are flying level and at the same altitude as the target T, the azimuth planes of the jets are coincident with each other, and these jet azimuth planes are also coincident with the earth azimuth plane in which the target T lies. Therefore, the following discussion made in conjunction with FIG. 3 refers to only a single azimuth plane.

Figure 4:
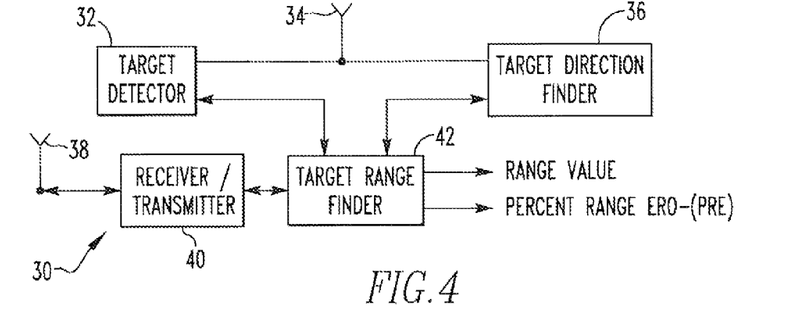
FIG. 4 is a schematic block diagram of an embodiment of a system that may be installed on one or on both of the fighter jets in FIG. 3 and that can detect and range a target according to the technique illustrated in FIG. 3.

FIG. 4 is a block diagram of a target detecting and ranging system 30, which is installed in the jets 20 and 22 of FIG. 3. The system 30 includes the following modules: a target detector 32, a directional first antenna 34 (e.g., a short-base or a long-base inferometer), a target direction finder 36, a second antenna 38, a transceiver 40, and a target range finder 42. Each of these modules may be instantiated in software, in hardware, or in a combination of software and hardware. Furthermore, although shown connected in a particular topology, the modules may be connected in any other suitable topology. In addition, although the functions of these modules are discussed below, in other embodiments the functions attributed below to multiple modules may be performed by a single module, and a function attributed below to a single module may be distributed among multiple modules.

Referring to FIGS. 3-4, an embodiment of a multi-jet technique for detecting and ranging the target T is discussed. Although steps of the technique are presented in a particular order, it is understood that these steps may be performed in any other suitable order. Furthermore, although the jet 20 is discussed as ranging the target T for both the jets 20 and 22, it is understood that the jet 22 may also range the target T for either of the jets. Furthermore, to avoid confusion, the target detecting and ranging system $30_1$ installed on the jet 20, and the components of this system, are referenced with a subscript "1", and the target detecting and ranging system $30_2$ installed on the jet 22, and the components of this system, are referenced with a subscript "2".

This multi-jet technique may be invoked when both of the target detectors $32_1$ and $32_2$ in the jets 20 and 22 detect the target T. Each detector $32_1$ and $32_2$ may detect the target in any suitable manner, such as the manner discussed above in conjunction with FIGS. 1-2.

Next, the target detector $32_1$ onboard the jet 20 types the target T. For example, the target detector $32_1$ may determine the type of the target T (e.g., hostile fighter jet, missile) based on the signature of a signal emitted by the target. Because techniques for typing a target are known, a discussion of these techniques is omitted for brevity.

The target detector $32_2$ also types the target T independently from the target detector $32_1$.

Then, the jet 22 transmits via its transceiver $40_2$ and antenna $38_2$ the target type that its target detector $32_2$ has determined for the target T.

Next, the jet 20 receives via its antenna $38_1$ and transceiver $40_1$ the target type transmitted by the jet 22, and the target detector $32_1$ compares the two target types determined by the target detectors $32_1$ and $32_2$.

If the two target types match, then the target detector $32_1$ determines that both the jets 20 and 22 are attempting to range the same target T, and allows the ranging of the target to proceed.

But if, the two target types do not match, then the target detector $32_1$ halts the ranging algorithm until such time as it determines that the jets 20 and 22 are attempting to range a same target.

If the target detector $32_1$ determines that both the jets 20 and 22 are attempting to range the same target T, then the target direction finders $46_1$ and 462 onboard the fighter jets determine the following quantities: $\theta_{AZ\_TARGET1}$, $\theta_{AZ\_JET1}$, $\theta_{AZ\_TARGET2}$, $\theta_{AZ\_JET2}$, and D.

$\theta_{AZ\_TARGET1}$ is the azimuth angle between the heading 24 of the jet 20 and the target T, and the direction finder $46_1$ may determine this angle by analyzing the phases of a signal received from the target by multiple elements of the first antenna $34_1$. As discussed above in conjunction with FIGS. 1-2, this signal may be, for example, emitted by the target T, or may be a radar signal reflected by the target.

Similarly, $\theta_{AZ\_TARGET2}$ is the azimuth angle between the heading 26 of the jet 22 and the target T, and the direction finder $36_2$ may determine this angle in a manner similar to that used by the direction finder $36_1$ to determine $\theta_{AZ\_TARGET1}$.

$\theta AZ_{\_JET1}$ is the azimuth angle between the jet 22 and the heading 24 of the jet 20. The direction finder $36_1$ may determine this angle in a manner similar to the manner it uses to determine $\theta AZ_{\_TARGET1}$. Alternatively, the direction finder $36_1$ may receive (via the antenna $38_1$ and transceiver $40_1$) from the jet 22 or from another source (e.g., a satellite or ground-based tracking station) the coordinates of the jet 22, and, therefore, may calculate $\theta_{AZ\_JET1}$ from the coordinates of the jets 20 and 22 using one or more trigonometric functions—it is assumed that the direction finder $36_1$ has access to the coordinates of the jet 20 in which it is installed.

Similarly, $\theta_{AZ\_JET2}$ is the azimuth angle between the jet 20 and the heading 26 of the jet 22. The direction finder $36_2$ may determine this angle in a manner similar to the manner in which the direction finder $36_1$ determines $\theta_{AZ\_JET1}$.

D is the straight-line distance between the jets 20 and 22, and is defined along a line 50 that is at the angle $\theta_{AZ\_JET1}$ from the heading 24 and that is at the angle $\theta_{AZ\_JET2}$ from the heading 26. For example, the target direction finder $36_1$ may calculate D from the coordinates of the jets 20 and 22.

Next, the jet 22 transmits via the antenna $38_2$ and the transceiver $40_2$ the values of $\theta_{AZ\_TARGET2}$ and $\theta_{AZ\_JET2}$ to the jet 20, and the target range finder $42_1$ receives these values via the antenna $38_1$ and the transceiver $40_1$.

Then, the target range finder $42_1$ on board the jet 20 calculates angles A and B according to the following equations, where A and B are interior angles of a triangle 52 with vertices at the jet 20, the jet 22, and the target T:

$$A = \theta_{AZ\_JET1} - \theta_{AZ\_TARGET1} \quad (1)$$

$$B = \theta_{AZ\_JET2} - \theta_{AZ\_TARGET2} \quad (2)$$

Next, the target range finder $42_1$ calculates the interior angle C of the triangle 52 according to the following equation:

$$C = 180° - A - B \quad (3)$$

Then, the target range finder $42_1$ calculates $H_{RANGE1}$ according to the following equation, which is derived from the law of sines:

$$H_{RANGE1} = \frac{D \cdot \sin B}{\sin C} \quad (4)$$

Because the jets 20 and 22 and the target T lie in the same plane in this embodiment, the actual range $R_{RANGE1}$ equals $H_{RANGE1}$.

Next, the target range finder $42_1$ may also calculate $H_{RANGE2}$ according to the following equation:

$$H_{RANGE2} = \frac{D \cdot \sin A}{\sin C} = R_{RANGE2} \quad (5)$$

Then, the target range finder $42_1$ may transmit the value of $H_{RANGE2}$ to the jet 22.

Still referring to FIGS. 3-4, the target direction finders $36_1$ and $36_2$ may compute the values of the azimuth angles $\theta_{AZ\_TARGET1}$, $\theta_{AZ\_TARGET2}$, $\theta_{AZ\_JET1}$, and $\theta_{AZ\_JET2}$ with respective errors in respective known error ranges, and these errors may introduce errors into the values that the target range finder $42_1$ computes for angles A and B.

And these errors in the angles A and B may introduce errors into the values that the target range finder $42_1$ calculates for $H_{RANGE1}$ and $H_{RANGE2}$.

It is sometimes useful to provide the pilot of a fighter jet, such as the jet 20 or 22, with the percentage range error (PRE) of the range values $H_{RANGE1}$ and $H_{RANGE2}$ so that the pilot may determine the "range window" of a target. This range window may give the pilot enough information to decide on what action to take relative to the target (e.g., engage or evade). For example, a missile on board the jet 20 may have a maximum range of ten nautical miles (NM). Therefore, if the target range finder $42_1$ provides $H_{RANGE1}$=9 NM, and PRE=+/−10%, then the pilot can determine that the maximum value of $H_{RANGE1}$=(9+0.01·9) NM=9.9 NM, and, therefore, that the target T is within the range of the missile.

Assuming that the sigma value $\sigma_A$ (the standard deviation from the correct value) for the angle A equals or is approximately equal to the sigma value $\sigma_B$ for the angle B, then the target range finder $42_1$ may calculate PRE according to either one of the following two equations:

$$PRE = \frac{\sigma_A \cdot \sqrt{\left[\left[\cos(A) - \frac{D}{H_{RANGE1}}\right]^2 + \sin^2(A)\right]^2 + \left[1 - \frac{D}{H_{RANGE1}} \cdot \cos(A)\right]^2}}{\frac{D}{H_{RANGE1}} \cdot \sin(A)} \cdot 100 \quad (6)$$

$$PRE = \frac{\sigma_B \cdot \sqrt{\left[\left[\cos(B) - \frac{D}{H_{RANGE2}}\right]^2 + \sin^2(B)\right]^2 + \left[1 - \frac{D}{H_{RANGE2}} \cdot \cos(B)\right]^2}}{\frac{D}{H_{RANGE2}} \cdot \sin(B)} \cdot 100 \quad (7)$$

And where $\sigma_A$ is not approximately equal to $\sigma_B$, then the target range finder $42_1$ may calculate PRE according to the following equation:

$$PRE = \frac{\sigma_B \cdot \sqrt{\left[1 - \frac{2D}{H_{RANGE1}} \cdot \cos(A) + \left[\frac{D}{H_{RANGE1}}\right]^2\right]^2 \cdot \sigma_B^2 + \left[1 - \frac{D}{H_{RANGE1}} \cdot \cos(A)\right]^2 \cdot \sigma_A^2}}{\frac{D}{H_{RANGE1}} \cdot \sin(A)} \cdot 100 \quad (8)$$

Because the jets 20 and 22 (and maybe the target T) are moving relative to one another, the targeting system $30_1$ may continuously update the values of $H_{RANGE1}$, $H_{RANGE2}$, and PRE, for example every second or every few seconds, until the target is destroyed, successfully evaded, or out of range.

Still referring to FIGS. 3-4, alternate embodiments of the described target detecting and ranging technique are contemplated. For example, although the jet 20 is described as calculating $H_{RANGE1}$ and $H_{RANGE2}$, the jet 22 may calculate these values, both jets may calculate these values, or the jet 20 may calculate $H_{RANGE1}$ and the jet 22 may calculate $H_{RANGE2}$. Furthermore, one or both of the jets 20 and 22 may be other objects or vehicles, such as a satellite, a tank, a helicopter, a water vessel, a balloon, or a missile or other projectile. Moreover, if there are multiple targets T, then the system $30_1$ may range each of these targets in a similar manner. In addition, although the target T is shown in front of both of the jets 20 and 22, the above-described detecting and ranging technique may be used regardless of the location of the target, as long as the jets and target do not lie along the same straight line. But because the jets 20 and 22 are moving relatively quickly, it is unlikely that the target T and the jets will lie along the same straight line for any significant period of time. Therefore, the target range finder $42_1$ may continue ranging the target T according to the above-described technique as soon as the target and jets 20 and 22 again form the vertices of a triangle such as the triangle 52. Furthermore, although described as a single antenna, each of the directional antennas $34_1$ and $34_2$ may include multiple antennas, such as multiple short-base-inferometer (SBI) antennas, that together provide data sufficient for the target direction finders $36_1$ and $36_2$ to determine the angles $\theta_{AZ\_TARGET1}$ and $\theta_{AZ\_TARGET2}$. Moreover, although the triangle 52 is described as lying in an earth azimuth plane, the detecting and ranging technique may be used regardless of the plane in which the triangle 52 lies.

Figure 5:
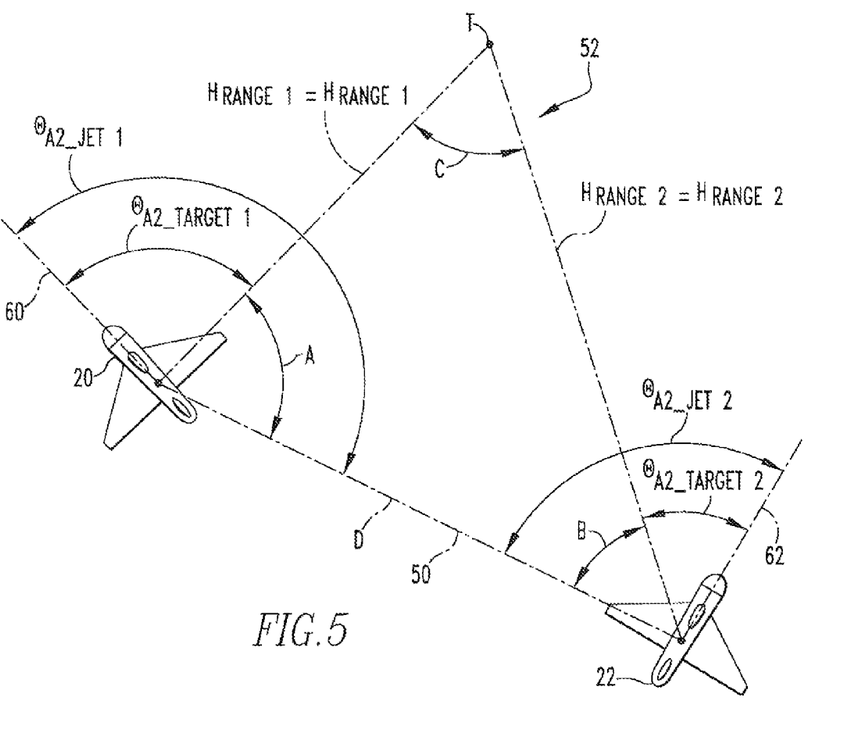
FIG. 5 is an overhead view of the first and second fighter jets and the target of FIG. 3 where the jets have non-parallel headings.

FIG. 5 is an overhead view of another embodiment of the two fighter jets 20 and 22 of FIG. 3. A difference between the example of FIG. 3 and that of FIG. 5 is that the jets 20 and 22 are traveling at non-parallel headings 60 and 62 in FIG. 5 such that the values of $\theta_{AZ\_TARGET1}$, $\theta_{AZ\_TARGET2}$, $\theta AZ_{JET1}$, and $\theta AZ_{JET2}$ in FIG. 5 are larger than the corresponding values in FIG. 3. But in FIG. 5, as in FIG. 3, the jets 20 and 22 and the target T are at substantially the same level altitude such that for purposes of the ranging calculations, the azimuth planes of the jets can be considered to be coincident with one another and with the earth azimuth plane in which the target T lies. Consequently, the targeting system $30_1$ onboard the jet 20 may use the same technique described above in conjunction with FIGS. 3-4 to calculate $H_{RANGE1}$, $H_{RANGE2}$, and PRE.

Figure 6:
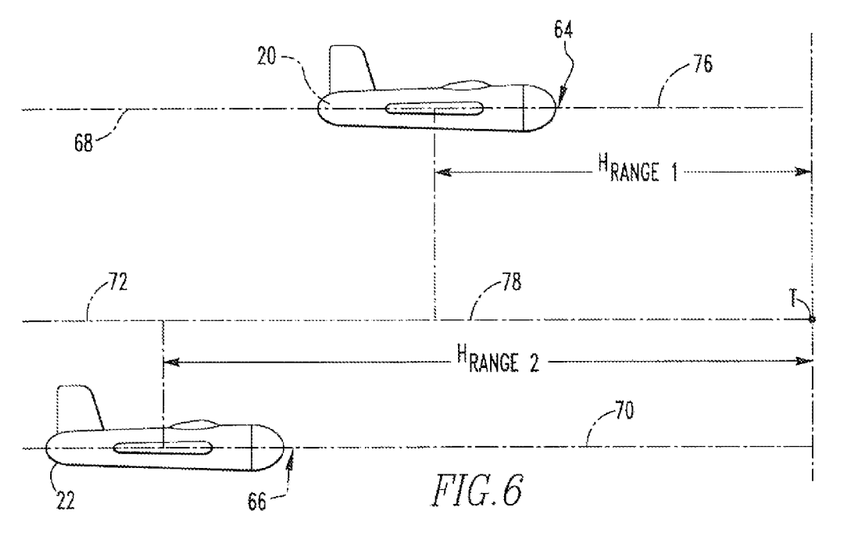
FIG. 6 is a side elevation view of the first and second fighter jets and the target of FIG. 3 where the jets and the target each have a different respective altitude.
Figure 7:
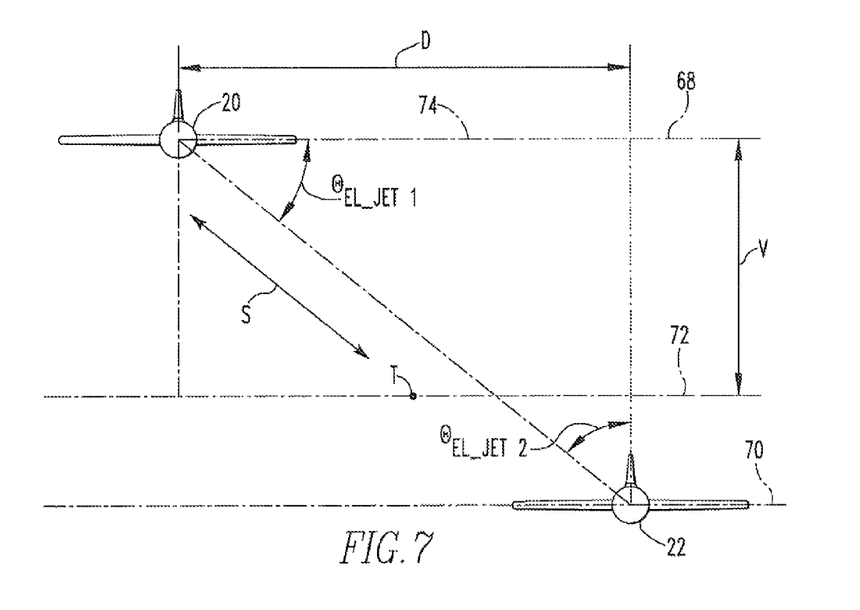
FIG. 7 is a rear elevation view of the first and second fighter jets and the target of FIG. 6 and illustrates an embodiment of a technique for determining the component of the distance between the jets in an earth azimuth plane.

FIGS. 6 and 7 are respective side and rear elevation views of another embodiment of the two fighter jets 20 and 22 of FIG. 3. A difference between the example of FIG. 3 and that of FIGS. 6-7 is that the jets 20 and 22 and the target T are all at different altitudes in FIGS. 6-7. But in FIGS. 6-7, the jets 20 and 22 are traveling at level altitudes and at parallel headings 64 and 66, and the target T is also at a level altitude such that the azimuth planes 68 and 70 of the jets 20 and 22 are parallel to each other and to the azimuth plane 72 in which the target T lies. Because the azimuth planes 68, 70, and 72 are parallel, one can project the straight-line segments 74, 76, and 78 along which are measured D, $H_{RANGE1}$, and $H_{RANGE2}$ onto the same azimuth plane, e.g., the target azimuth plane 72, such that in this plane is formed a triangle similar to the triangle 52 of FIG. 3. Consequently, the targeting system $30_1$ onboard the jet 20 may use the same technique described above in conjunction with FIGS. 3-4 to calculate $H_{RANGE1}$, $H_{RANGE2}$, and PRE.

Furthermore, because in this embodiment $R_{RANGE1} \neq H_{RANGE1}$ and $R_{RANGE2} \neq H_{RANGE2}$, a technique for calculating $R_{RANGE1}$ and $R_{RANGE2}$ (not shown in FIGS. 6-7) is discussed below in conjunction with FIG. 8.

Referring to FIG. 7, the target range finder $42_1$ (FIG. 4) onboard the jet 20 may calculate the azimuth distance D between the jets 20 and 22 in a variety of ways. For example, if the range finder $42_1$ receives the XYZ coordinates of the jets 20 and 22, then the range finder may calculate $D = X_{JET20} - X_{JET22}$. Alternatively, the range finder $42_1$ may determine a projected distance S between the jets from the coordinates, determine the vertical distance V as the difference between the altitudes of the jets 20 and 22, and then solve for D using the Pythagorean Theorem. Or, the target systems $30_1$ and $30_2$ of the jets 20 and 22 may determine the—distance S—for purposes of this calculation, S is the actual distance between the jets 20 and 22 projected onto an elevation plane that also contains D and V—or the distance V, determine the angles $\theta_{EL\_JET1}$ and $\theta_{EL\_JET2}$, and calculate D using the law of sines.

Figure 8:
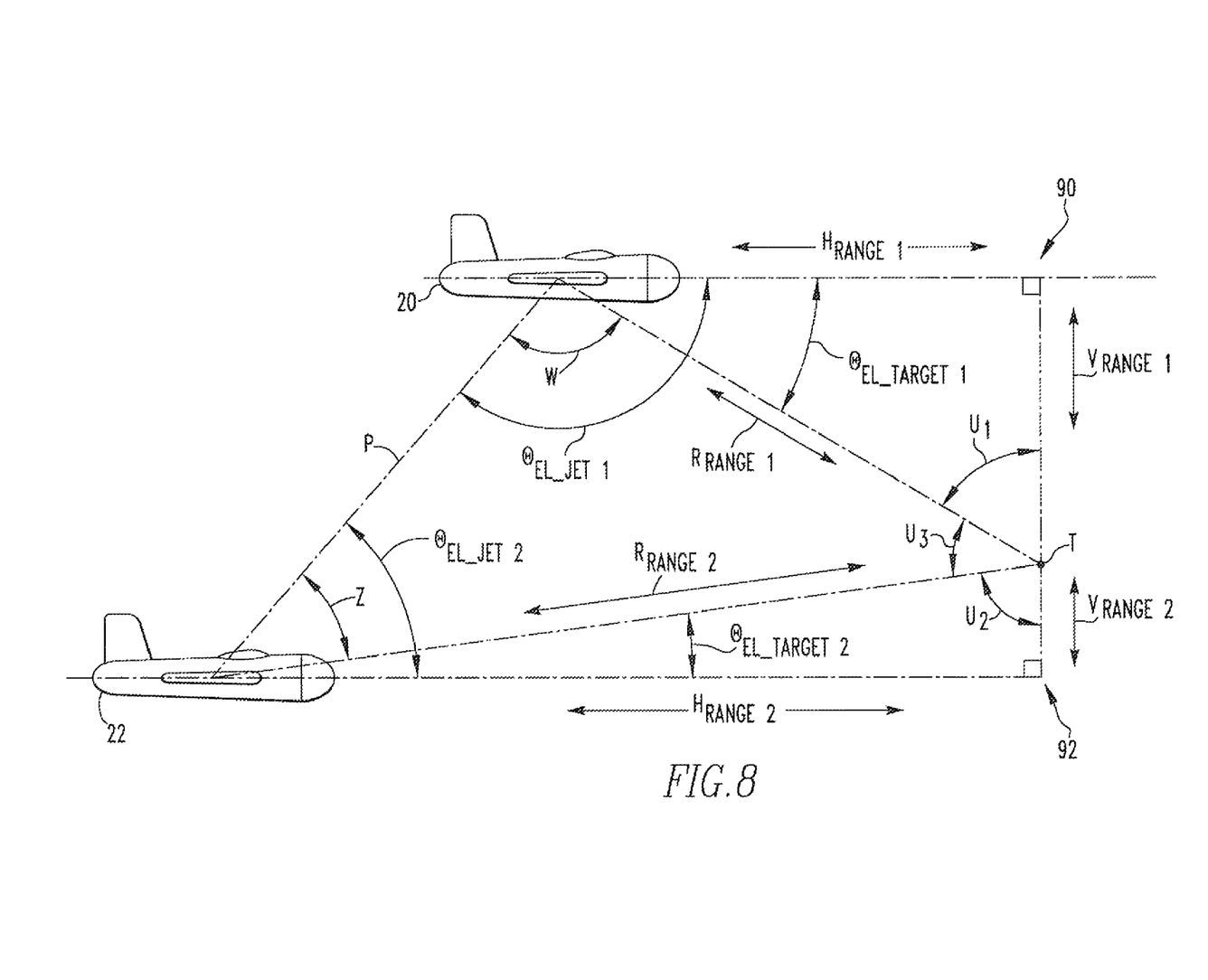
FIG. 8 is a side elevation view of the first and second fighter jets and the target of FIGS. 6-7, and illustrates an embodiment of a technique for determining the actual ranges of the target from the jets.

FIG. 8 is a side elevation view of the jets 20 and 22 and the target T of FIGS. 6-7, and illustrates an embodiment of a technique for determining $R_{RANGE1}$ and $R_{RANGE2}$, which are the respective actual ranges of the target from the jets 20 and 22.

Referring to FIGS. 4 and 8, the target range finder $42_1$ calculates $H_{RANGE1}$ and $H_{RANGE2}$ as discussed above in conjunction with FIGS. 6-7.

$H_{RANGE1}$, $V_{RANGE1}$, and $R_{RANGE1}$ form a right triangle 90 in a first elevation plane, and $H_{RANGE2}$, $V_{RANGE2}$, and $R_{RANGE2}$ form a right triangle 92 in a second elevation plane. For purposes of illustration, both of these elevation planes are overlaid onto a single elevation plane that is parallel or coincident with the plane in which FIG. 8 lies.

Next, the target direction finders $36_1$ and $36_2$ respectively determine the elevation angles $\theta_{EL\_TARGET1}$ and $\theta_{EL\_TARGET2}$ in a manner that may be similar to the manner in which the direction finders determine the azimuth angles $\theta_{AZ\_TARGET1}$ and $\theta_{AZ\_TARGET2}$ of FIG. 3.

Then, the target range finder $42_1$ receives the value of $\theta_{EL\_TARGET2}$ from the jet 22, and calculates the angles $U_1$ and $U_2$ according to the following equations:

$$U_1 = 90° - \theta_{EL\_TARGET1} \quad (9)$$

$$U_2 = 90° - \theta_{EL\_TARGET2} \quad (10)$$

Next, the range finder $52_1$ calculates $R_{RANGE1}$ and $R_{RANGE2}$ according to the following equations:

$$R_{RANGE1} = \frac{H_{RANGE1}}{\sin U_1} \quad (11)$$

$$R_{RANGE2} = \frac{H_{RANGE2}}{\sin U_2} \quad (12)$$

The range finder $42_1$ may also calculate a PRE for $R_{RANGE1}$ and $R_{RANGE2}$ by taking into account the PRE of $H_{RANGE1}$ and $H_{RANGE2}$ and the sigmas for $\theta_{EL\_TARGET1}$ and $\theta_{EL\_TARGET2}$.

Still referring to FIG. 8, other embodiments for calculating $R_{RANGE1}$ and $R_{RANGE2}$ are contemplated. For example, referring to FIGS. 3, 4 and 8, the range finder $42_1$ may determine a distance P between the jets 20 and 22 in a manner similar to that used to calculate the distance D (FIG. 7)—P is the projection of S (the actual distance between the jets 20 and 22) onto the elevation plane onto which the above-described first and second elevation planes are overlaid—may calculate angles W and Z from $\theta_{EL\_TARGET1}$, $\theta_{EL\_JET1}$, $\theta_{EL\_TARGET2}$, and $\theta_{EL\_JET2}$ in a manner similar to that used to calculate angles A and B from $\theta_{AZ\_TARGET1}$, $\theta_{AZ\_JET1}$, $\theta_{AZ\_TARGET2}$, and $\theta_{AZ\_JET2}$ of FIG. 3, and may calculate $U_3$, $R_{RANGE1}$, and $R_{RANGE2}$ in a manner similar to that used to calculate C, $H_{RANGE1}$, and $H_{RANGE2}$ of FIG. 3. Or, the range finder $42_2$ on board the jet 22 may calculate $R_{RANGE1}$, $R_{RANGE2}$, or both of these values.

Figure 9:
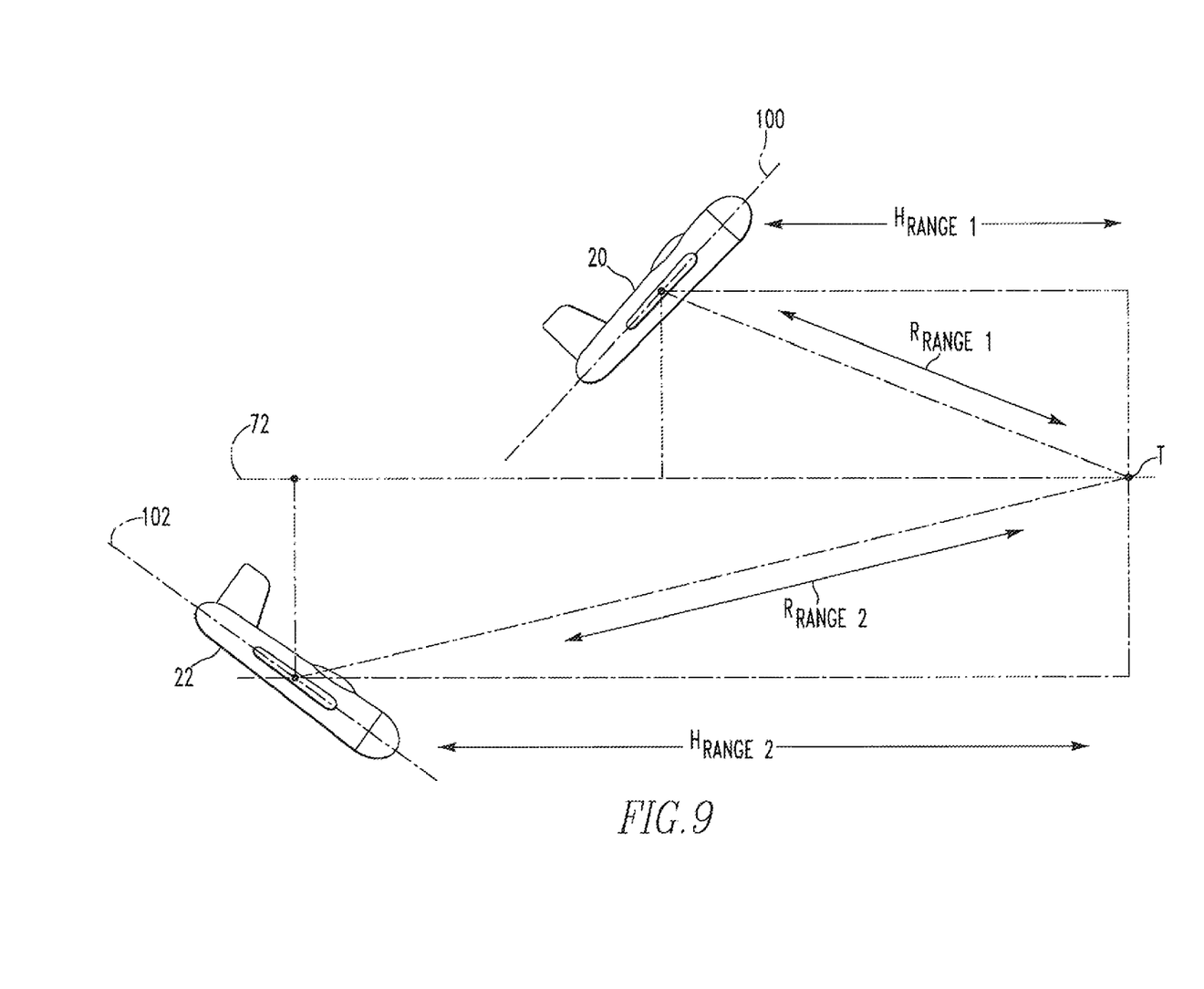
FIG. 9 is a side elevation view of the first and second fighter jets and the target of FIG. 3, where the jets and the target each have a different respective altitude and where the jets are flying at unlevel altitudes.

FIG. 9 is a side elevation view of another embodiment of the two fighter jets 20 and 22 of FIGS. 6-7. A difference between the example of FIGS. 6-7 and that of FIG. 9 is that the jets 20 and 22 are not flying at level altitudes and are not flying at parallel headings, because the first jet 20 is climbing, and the second jet 22 is diving. Therefore, the azimuth planes 100 and 102 of the jets 20 and 22 are not parallel to each other or to the azimuth plane 72 in which the target T lies. Furthermore, the headings of one or both of the jets 20 and 22 may not lie in parallel planes as shown in FIG. 5. But even though the azimuth planes 72, 100, and 104 are not parallel to one another, and the jet headings may not lie in parallel planes, one can project the azimuth angles $\theta_{AZ\_TARGET1}$, $\theta_{AZ\_JET1}$, $\theta_{AZ\_TARGET2}$, and $\theta_{AZ\_JET2}$ (not shown in FIG. 9) from the jet azimuth planes 100 and 102 onto the target azimuth plane 72, and can project D (not shown in FIG. 9) onto the plane 72 such that a triangle similar to the triangle 52 in FIG. 3 is formed in the plane 72. Consequently, the targeting system $30_1$ onboard the jet 20 may use the same technique described above in conjunction with FIGS. 3-7 to calculate $H_{RANGE1}$ and $H_{RANGE2}$ in the plane 72, and to calculate PRE. Even though $H_{RANGE1}$ and $H_{RANGE2}$ do not lie in the respective azimuth planes 100 and 102 of the jets 20 and 22, these values may nevertheless be useful because often times a pilot would like to know the "horizontal range" (i.e., the range in an earth azimuth plane) to a target. The targeting system $30_1$ may also use the same technique described above in conjunction with FIG. 8 to calculate $R_{RANGE1}$, $R_{RANGE2}$, and a PRE for these values.

Referring to FIGS. 6-9, alternate embodiments of the ranging techniques are contemplated. For example, although the target T is shown at an altitude that is between the altitudes of the jets 20 and 22, T may have any altitude or be ground-based. Furthermore, T may have any azimuth location relative to the jets 20 and 22. Moreover, because $H_{RANGE}$ is often more useful to a pilot than $R_{RANGE}$, the target systems $30_1$ and $30_2$ onboard the jets 20 and 22 may calculate only $H_{RANGE1}$ and $H_{RANGE2}$. In addition, any alternatives discussed above in conjunction with FIG. 1-5 may also be applicable to the embodiments of FIG. 6-9.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

What is claimed is:

1. An apparatus, comprising:
a detector operable to detect a target;
a direction finder operable to determine a first direction to the target from the apparatus;
a receiver operable to receive a second direction, the second direction being to the target from an object that is remote from the apparatus and the target; and
a range finder operable to determine from the first and second directions a range of the target from the apparatus.

2. The apparatus of claim 1 wherein:
the detector is operable to detect as the first direction a first angle between the target and a heading of the apparatus; and
the receiver is operable to receive as the second direction a second angle between the target and a heading of the remote object.

3. The apparatus of claim 1 wherein:
the detector is operable to detect as the first direction a first angle between the target and a heading of the apparatus, the first angle lying in a plane; and
the receiver is operable to receive as the second direction a second angle between the target and a heading of the remote object, the second angle lying in the plane.

4. The apparatus of claim 1 wherein:
the detector is operable to detect as the first direction a first angle between the target and a heading of the apparatus, the first angle lying in an azimuth plane; and
the receiver is operable to receive as the second direction a second azimuth angle between the target and a heading of the remote object, the second angle lying in the azimuth plane.

5. The apparatus of claim 1 wherein the direction finder comprises a directional antenna.

6. The apparatus of claim 1 wherein:
the receiver is operable to receive location data corresponding to a location of the remote object; and
the range finder is operable to determine from the location data the range of the target from the apparatus.

7. The apparatus of claim 1, further comprising an engine operable to move the apparatus.

8. The apparatus of claim 1 wherein the range finder is operable to determine from the first and second directions a range of the target from the remote object.

9. A system, comprising:
a first object; and
a second object including
a detector operable to detect a target that is different than the first and second objects,
a direction finder operable to determine a first direction to the target from the second object,
a receiver operable to receive a second direction, the second direction being to the target from the first object, which is remote from the second object and the target, and
a range finder operable to determine from the first and second directions a range of the target from the second object.

10. The system of claim 9 wherein:
the first object comprises a first vehicle; and
the second object comprises a second vehicle.

11. The system of claim 9 wherein:
the first object comprises a first airplane; and
the second object comprises a second airplane.

12. The system of claim 9 wherein the receiver is operable to receive the second direction from the first object.

13. A method, comprising:
determining a first direction to a target from a first moving object;
determining a second direction to the target from a second moving object; and
determining from the first and second directions a range of the target from one of the first and second objects.

14. The method of claim 13 wherein the target is moving.

15. The method of claim 13 wherein the target is airborne.

16. The method of claim 13 wherein at least one of the first and second objects is airborne.

17. The method of claim 13 wherein the first and second objects respectively comprise first and second airships that are flying at substantially parallel headings.

18. The method of claim 13 wherein the first and second objects respectively comprise first and second airships that are flying at substantially non-parallel headings.

19. The method of claim 13 wherein the first and second objects respectively comprise first and second airships that are flying substantially level and at substantially a same altitude.

20. The method of claim 13 wherein the first and second objects respectively comprise first and second airships that are flying substantially level and at substantially different altitudes.

21. The method of claim 13 wherein:
the first and second objects respectively comprise first and second airships; and
at least one of the first and second airships is flying substantially unlevel.

22. The method of claim 13 wherein:
determining the first direction comprises determining a first angle between the target and a reference axis associated with the first object; and
determining the second direction comprises determining a second angle between the target and a reference axis associated with the second object.

23. The method of claim 13 wherein:
determining the first direction comprises determining a first angle between the target and a heading of the first object; and
determining the second direction comprises determining a second angle between the target and a heading of the second object.

24. The method of claim 13, further comprising:
determining a distance between the first and second objects; and
determining the range from the distance.

25. The method of claim 13, further comprising determining an error in the range from an error in one of the first and second directions.

26. The method of claim 13 wherein determining the range comprises determining the range along a line that is substantially level.

* * * * *